Patented Oct. 30, 1945

2,388,024

UNITED STATES PATENT OFFICE 2,388,024

THIOBARBITURIC ACID DERIVATIVES AND THEIR SALTS

Lewis A. Walter, East Orange, N. J., assignor to The Maltbie Chemical Company, Newark, N. J., a corporation of New Jersey No Drawing. Application February 28, 1942, Serial No. 432,889

14 Claims. (Cl. 260—260)

The present invention relates to certain new and useful 5,5 disubstituted thiobarbituric acids, and their salts, having the formula:

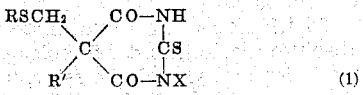

wherein R and R' are hydrocarbon groups, either saturated or unsaturated, and either the same or different, and each of which contains not more than six carbon atoms, and wherein the sum of the carbon atoms in R and R' does not exceed 10, it being understood that R has a carbon atom attached directly to the sulfur of the thiomethylene group and R' has a carbon atom attached directly to the carbon atom forming the barbituric acid nucleus; and wherein X is a member selected from the group consisting of hydrogen, alkalimetal, an equivalent of alkaline earth metal, ammonium, monoalkyl ammonium, dialkyl ammonium, alkanol ammonium and an equivalent of alkylene diammonium.

These novel thiobarbituric acid compounds and their salts, when tested pharmacologically, have been found to possess useful and valuable hypnotic and sedative properties, making them valuable for various medical purposes. The compounds are, in general, pale yellow in color, and are generally crystalline solids.

In general, the following method has been found desirable, and is the best now known to me, for the preparation of my novel thiobarbituric acid derivatives herein described; but other methods of synthesis may also be employed, as for example, synthesis through the corresponding disubstituted cyano acetic ester.

According to what is at present the preferred procedure for synthesis, a disubstituted malonic ester (such as may be prepared, for example, in accordance with United States Letters Patent No. 2,354,231, patented July 25, 1944) is condensed with thiourea in the presence of sodium ethoxide in an organic solvent such as, for example, absolute alcohol. When reaction is complete, the solvent is removed by distillation and the residue is dissolved in water. The aqueous solution is then extracted with ether and the aqueous layer is separated and acidified, yielding a precipitate of the desired thiobarbituric acid, which may be filtered off and purified by crystallization from a suitable solvent such as ethanol.

The following specific examples are illustrative of the novel compounds according to my invention:

Example 1

5-ethylthiomethylene-5-ethyl thiobarbituric acid:

To 1.1 moles of sodium, dissolved in 500 cc. of absolute alcohol, and 0.5 moles of ethylthiomethylene ethyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether and the aqueous layer is separated and acidified, yielding a precipitate of 5-ethyl thiomethylene-5-ethyl thiobarbituric acid, which is filtered off and purified by crystallization from alcohol. It has a melting point of approximately 145–146° C. (uncorrected), and is represented by the formula

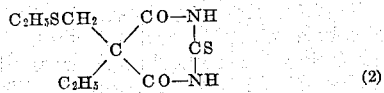

Example 2

5-methylthiomethylene-5-isobutyl thiobarbituric acid:

To 1.1 moles of sodium, dissolved in 500 cc. of absolute alcohol, and 0.5 moles of methylthiomethylene isobutyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether and the aqueous layer is separated and acidified, yielding a precipitate of 5-methylthiomethylene-5-isobutyl thiobarbituric acid, which is filtered off and purified by crystallization from alcohol. It has a melting point of approximately 155–156° C. (uncorrected), and is represented by the formula:

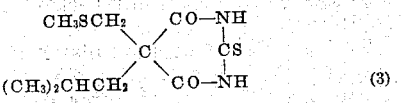

Example 3

5-ethylthiomethylene-5-isobutyl thiobarbituric acid:

To 1.1 moles of sodium, dissolved in 500 cc. of absolute alcohol, and 0.5 moles of ethylthiomethylene isobutyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether, and the aqueous layer is separated and acidified, yielding a precipitate of 5-ethylthiomethylene-5-isobutyl thiobarbituric acid, which is filtered off and purified by crystallization from alcohol. It has a melting point of 145–147° C. (uncorrected), and is represented by the formula:

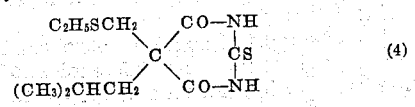

Example 4

5-ethylthiomethylene-5-secondary butyl thiobituric acid:

To 1.1 moles of sodium, dissolved in 500 cc. of absolute alcohol, and 0.5 moles of ethylthiomethylene secondary butyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether, and the aqueous layer is separated and acidified, yielding a precipitate of 5-ethylthiomethylene-5-secondary butyl thiobarbituric acid, which is filtered off and purified by crystallization from alcohol. It has a melting point of approximately 114–116° C. (uncorrected), and is represented by the formula:

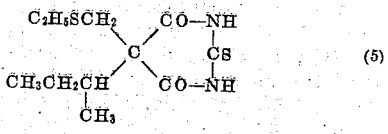 (5)

Example 5

5-ethylthiomethylene-5-(1-methylbutyl) thiobarbituric acid:

To 1.1 moles of sodium, dissolved in 500 cc. of absolute alcohol, and 0.5 moles of ethylthiomethylene 1-methylbutyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether, and the aqueous layer is separated and acidified, yielding a precipitate of 5-ethylthiomethylene-5-(1-methylbutyl) thiobarbituric acid, which is filtered off and purified by crystallization from alcohol. It has a melting point of approximately 97–100° C. (uncorrected), and is represented by the formula:

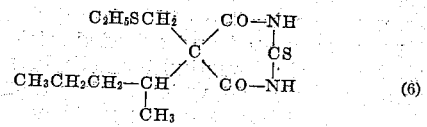 (6)

Example 6

5-isoamylthiomethylene-5-ethyl thiobarbituric acid:

To 1.1 moles of sodium, dissolved in 500 cc. of absolute alcohol, and 0.5 moles of isoamylthiomethylene ethyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether and the aqueous layer is separated and acidified, yielding a precipitate of 5-isoamylthiomethylene-5-ethyl thiobarbituric acid, which is filtered off and purified by crystallization from alcohol. It has a melting point of approximately 131.5–132.5° C. (uncorrected), and is represented by the formula:

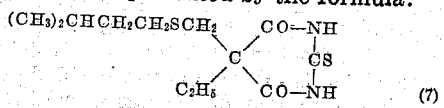 (7)

Example 7

5-ethylthiomethylene-5-allyl thiobarbituric acid:

To 1.1 moles of sodium, dissolved in 500 cc. of absolute alcohol, and 0.5 moles of ethylthiomethylene allyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether, and the aqueous layer is separated and acidified, yielding a precipitate of 5-ethylthiomethylene-5-allyl thiobarbituric acid, which is filtered off and purified by crystallization from alcohol. It has a melting point of approximately 122–123° C. (uncorrected), and is represented by the formula:

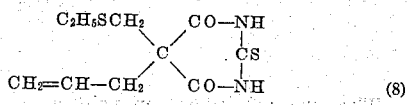 (8)

Example 8

5-isopropylthiomethylene-5-ethyl thiobarbituric acid:

To 1.1 moles of sodium, dissolved in 500 cc of absolute alcohol, and 0.5 moles of isopropylthiomethylene ethyl malonic ester, 0.6 moles of thiourea are added. This mixture is refluxed on a steam bath for 12 hours, the alcohol is removed by vacuum distillation, and the residue is dissolved in about 600 cc. of water. The resulting solution is extracted with ether and the aqueous layer is separated and acidified, yielding a precipitate of 5-isopropylthiomethylene-5-ethyl thiobarbituric acid, which is filtered off and purified by crystallization from alcohol. It has a melting point of approximately 175–176° C. (uncorrected), and is represented by the formula:

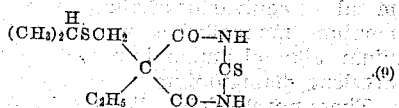 (9)

From the foregoing examples, which are illustrative of the scope of my invention, as regards the novel thiobarbituric acids, it will be observed that the substituent groups R and R', as defined above, are capable of considerable variation within those limits, while producing good results and useful and valuable compounds. Thus the foregoing derivatives, which are intended to be illustrations only, and not exclusive, may be summarized as follows:

| Thiobarbituric acid | | Approximate melting point °C. |
|---|---|---|
| $RSCH_2$ $\diagdown$ $CO-NH$ $\diagdown$ C $\diagup$ $CS$ $R'$ $\diagup$ $CO-NH$ | | (Uncorrected) |
| Wherein: | | |
| R is: and | R' is: | |
| Methyl | Isobutyl | 155–156 |
| Ethyl | Ethyl | 145–146 |
| Ethyl | Allyl | 122–123 |
| Ethyl | Secondary butyl | 114–116 |
| Ethyl | Isobutyl | 145–147 |
| Ethyl | 1-methylbutyl | 97–100 |
| Isopropyl | Ethyl | 175–176 |
| n-Butyl | n-Butyl | 90–92 |
| Isoamyl | Ethyl | 131.5–132.5 |

Salts of the novel thiobarbituric acid derivatives

Many sodium salts of the thiobarbituric acids described above may be prepared by dissolving 1 mole of the di-substituted thiobarbituric acid in the minimum quantity of hot absolute alcohol and adding a solution containing one equivalent of sodium in absolute alcohol. On cooling, or on evaporation of the alcohol, the sodium salt separates as crystals, or in amorphous form. In some instances a syrup results and this material, when stirred with dry ether, gives the sodium salt in amorphous form.

Other alkali-metal salts may also be derived by a similar procedure.

The sodium salts of my novel thiobarbituric acid derivatives have been found to be readily soluble in water, and their aqueous solutions are alkaline in reaction. When administered orally or hypodermically in proper dosage they are good and useful hypnotics or sedatives, and range in duration of action from long to ultra-short acting.

Calcium salts may be prepared by treating an absolute alcohol solution of the sodium salt with the metathetical amount of alcoholic calcium chloride, filtering off the precipitated sodium chloride and concentrating the alcoholic solution to yield the calcium salt.

The ammonium, alkyl and alkanol ammonium salts may be prepared by dissolving the corresponding thiobarbituric acid in an excess of ammonia or amine and subsequently removing the excess quantity of base.

In the following claims it is to be understood that "thiobarbituric acid derivative" and similar expressions, includes, also, the salts of such derivatives, such as, for example, the salts described above.

The examples given above, and illustrative processes for their production, include the best embodiments of my present invention now known to me; but it is to be understood that the invention is not necessarily or specifically limited thereto and may, under proper conditions, have other embodiments, produced in other ways, without departure from the spirit of the invention, and within the scope of the following claims:

I claim:

1. A new composition of matter useful in therapeutics, comprising a 5, 5 disubstituted thiobarbituric acid derivative having the formula:

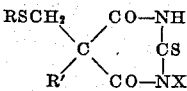

wherein R and R' are hydrocarbon groups, each of which contains not more than six carbon atoms, and wherein the sum of the carbon atoms in R and R' does not exceed 10, R has a carbon atom attached directly to the sulfur of the thiomethylene group, and R' has a carbon atom attached directly to the carbon atom forming the thiobarbituric acid nucleus; and wherein X is a member selected from the group consisting of hydrogen, alkali-metal, an equivalent of alkaline earth metal, ammonium, monoalkyl ammonium, dialkyl ammonium, alkanol ammonium, and an equivalent of alkylene diammonium.

2. A composition of matter according to claim 1 in which X represents hydrogen.

3. A composition of matter according to claim 1 in which at least one of the R and R' groups is a primary hydrocarbon group.

4. A composition of matter according to claim 1 in which R and R' are both primary hydrocarbon groups.

5. A composition of matter according to claim 1 in which at least one of the R and R' groups is a primary hydrocarbon group and X represents hydrogen.

6. A composition of matter according to claim 1 in which R and R' are both primary hydrocarbon groups and X represents hydrogen.

7. A composition of matter according to claim 1 in which R is a primary hydrocarbon group and R' is a secondary hydrocarbon group.

8. A composition of matter according to claim 1 in which R is a primary hydrocarbon group, R' a secondary hydrocarbon group, and X represents hydrogen.

9. A composition of matter according to claim 1 in which R is a secondary hydrocarbon group and R' is a primary hydrocarbon group.

10. A composition of matter according to claim 1 in which R is a secondary hydrocarbon group, R' a primary hydrocarbon group, and X represents hydrogen.

11. A new composition of matter useful in therapeutics, comprising: 5-ethylthiomethylene-5-(1-methyl-butyl) thiobarbituric acid.

12. A new composition of matter useful in therapeutics, comprising: 5-isopropylthiomethylene-5-ethyl thiobarbituric acid.

13. The process of producing a 5,5 disubstituted thiobarbituric acid derivative according to claim 1, which comprises condensing the corresponding disubstituted malonic ester with thiourea, in the presence of sodium ethylate in an organic solvent.

14. A new composition of matter, useful in therapeutics, comprising

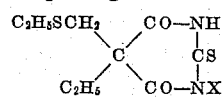

where X is an equivalent selected from the group which consists of hydrogen, alkali metal, alkaline earth metal, ammonium, monoalkyl ammonium, dialkyl ammonium, alkanol ammonium and alkylene diammonium.

LEWIS A. WALTER.